(12) United States Patent
Ning et al.

(10) Patent No.: US 10,500,654 B2
(45) Date of Patent: Dec. 10, 2019

(54) MODULAR CUTTING TOOL

(71) Applicant: Kennametal Inc., Latrobe, PA (US)

(72) Inventors: Li Ning, Pleasant Unity, PA (US); Nicholas Henry, Greensburg, PA (US)

(73) Assignee: KENNAMETAL INC, Latrobe, PA (US)

( * ) Notice: Subject to any disclaimer, the term of this patent is extended or adjusted under 35 U.S.C. 154(b) by 21 days.

(21) Appl. No.: 15/868,576

(22) Filed: Jan. 11, 2018

(65) Prior Publication Data

US 2019/0210125 A1    Jul. 11, 2019

(51) Int. Cl.
*B23C 5/26* (2006.01)
*B23C 5/00* (2006.01)
*B23C 5/10* (2006.01)
*B23C 9/00* (2006.01)

(52) U.S. Cl.
CPC ............... *B23C 5/26* (2013.01); *B23C 5/006* (2013.01); *B23C 5/10* (2013.01); *B23C 9/005* (2013.01); *B23C 2210/02* (2013.01); *B23C 2240/24* (2013.01)

(58) Field of Classification Search
CPC ... B23B 2240/36; B23B 2251/02; B23C 5/26; B23C 2210/02; B23C 2240/24; B23C 9/005
See application file for complete search history.

(56) References Cited

U.S. PATENT DOCUMENTS

| | | | |
|---|---|---|---|
| 4,102,594 A | 7/1978 | Kress | |
| 4,813,824 A | 3/1989 | Grunsky | |
| 6,254,319 B1 | 7/2001 | Maier | |
| 2011/0262232 A1* | 10/2011 | Chen | B23B 29/046 407/46 |
| 2012/0201629 A1* | 8/2012 | Dudzinsky | B23B 31/11 411/411 |

FOREIGN PATENT DOCUMENTS

| | | | | |
|---|---|---|---|---|
| DE | 2907994 A1 | * | 11/1979 | ............ B23C 5/26 |
| DE | 202016103727 U1 | * | 7/2016 | ............ B23C 5/16 |
| GB | 191416932 A | | 7/1915 | |
| GB | 513479 A | | 10/1939 | |
| GB | 602830 | | 6/1948 | |
| GB | 2164276 B | | 7/1987 | |
| RU | 2062181 | | 6/1996 | |

* cited by examiner

*Primary Examiner* — Alan Snyder

(74) *Attorney, Agent, or Firm* — Matthew S. Bedsole

(57) ABSTRACT

A modular cutting tool includes a cutting head, a shank and a mechanism which assists in assembling and locks the cutting head to the shank. The cutting head includes a cutting portion rotatable about a central longitudinal axis and a cylindrical skirt extending axially from the cutting portion and terminating at a contact face disposed perpendicular to the longitudinal axis. The skirt has a number of curved inner surfaces which generally define a bore disposed about the longitudinal axis. The shank includes a cylindrical portion of a first diameter disposed about the central longitudinal axis and a central protrusion disposed in the bore of the cutting portion. The central protrusion has a second diameter less than the first diameter and extends longitudinally from a contact face disposed perpendicular to the longitudinal axis at a leading end of the cylindrical portion.

15 Claims, 9 Drawing Sheets

MODULAR CUTTING TOOL

FIELD

The disclosed concept relates to modular cutting tools such as modular reaming tools. The disclosed concept also relates to replaceable components for use with modular cutting tools.

BACKGROUND

Modular rotary cutting tools, such as modular reamers, typically include two pieces, namely, a reamer portion and a shank. The reamer portion generally includes a head having a shank in the shape of a tapered cone extending therefrom. This shank is inserted into the bore of a shank member, and one or more screws are used to attach the reamer portion to the shank. The reamer head typically has outwardly projecting blade portions with cutting edges which alternate with valley portions, or, flutes.

A reamer head may be constructed of steel and may include a series of steel blade pockets positioned about the circumferential edge of the reamer head. These pockets may each include a cutting edge member seated in a pocket. Such cutting edge members may be carbide and are typically brazed to the pockets to hold them in place. A potential concern for this type of construction of a reamer head may include limitations in the ability to apply one or more coatings to the reamer head for improving the life and/or operational characteristic of the reamer head. For example, such coatings may include, without limitation, use of physical vapor deposition and/or chemical vapor deposition processes. Because of the temperatures required for such coating processes, and in order to minimize dimensional changes in the brazed construction during and/or following the coating processes, the dimensional range of the reamer head may be limited. Additionally, the selection of brazing materials may become limited to those that can withstand the temperatures of the coating process without unduly degrading in some manner. In some instances, the coating process may approach or exceed brazing temperatures, in which case such coating process may not be readily usable on a brazed reamer head due to the potentially detrimental effect of the coating process on the reamer head.

Flutes between the pocketed cutting edge members provide clearance for evacuation of chips removed from a work piece during operation of the reamer head. Generally, it is desirable to maximize the number of cutting edges and flutes about the circumferential edge of the reamer head in order to increase cutting efficiency. Accordingly, the space required for the pockets and brazing impacts the number of cutting edges and flutes which can be spaced about the finite length of the reamer head's circumferential edge.

Additionally, because of the various materials used in such a modular reamer, namely, steel, carbide, brazing material, etc., the reuse, refurbishment and/or recycling of worn reamer heads may be problematic, given the reamer's mixed material components.

In view of these considerations, significant barriers may exist in maximizing the number of cutting edges on a rotary cutting tool and/or in its reuse, refurbishment and/or recycling.

SUMMARY

As one aspect of the disclosed concept a modular cutting tool is provided. The modular cutting tool comprises a cutting head, a shank and a mechanism which assists in assembling and locks the cutting head to the shank. The cutting head comprises: a cutting portion rotatable about a central longitudinal axis; and a cylindrical skirt extending axially from the cutting portion and terminating at a contact face disposed perpendicular to the longitudinal axis, the skirt having a number of curved inner surfaces which generally define a bore disposed about the longitudinal axis. The shank comprises: a cylindrical portion of a first diameter disposed about the longitudinal axis; and a central protrusion disposed in the bore of the cutting portion, the central protrusion having a second diameter less than the first diameter and extending longitudinally from a contact face disposed perpendicular to the longitudinal axis at a leading end of the cylindrical portion.

The skirt may further include a number of cut-out regions which extend from the contact face toward the cutting portion between the number of inner surfaces and an outer surface, each cut-out region being bound, in-part, by a leading face, a trailing face, and by a clamping face which is formed on a portion of the skirt which extends generally circumferentially into each cutout region from the trailing edge.

The shank may further comprise: a first alcove formed in the cylindrical portion abutting the contact surface; a second alcove formed in the cylindrical portion abutting the contact surface opposite the first alcove; and a transverse bore extending between the first alcove and the second alcove and disposed about a transverse axis which is disposed perpendicularly to, and intersects the longitudinal axis.

The mechanism may comprise: a first locking drive key; a second locking drive key; and a differential screw member disposed within the transverse bore and having a first threaded portion disposed at or about a first end and a second threaded portion disposed at or about a second end opposite the first end, wherein the first threaded portion includes a first plurality of threads disposed in a first direction and second threaded portion includes a second plurality of threads disposed in a second direction, opposite the first direction. The first locking drive key and the second locking drive key may each comprise: a main body portion fit generally within a respective one of the first alcove or the second alcove, the main body portion having: an inner face facing toward the longitudinal axis; an outer face disposed opposite the inner face; a leading side face which extends between the inner face and the outer face on a leading side of the main body portion when the shank is rotated about the longitudinal axis in a cutting direction; and a trailing side face which extends between the inner face and the outer face on a trailing side of the main body portion when the shank is rotated about the longitudinal axis in the cutting direction. The first locking drive key and the second locking drive key may further comprise a central projection extending from the inner face of the main body portion radially inward toward the longitudinal axis; and a lateral projection extending generally tangentially with respect to a reference circle centered about the longitudinal axis from the trailing side face of the main body portion at or about an upper portion of the main body portion. The upper portion of each main body portion of each drive key may be disposed in a respective one of the cut-out regions of the skirt of the cutting tool. The lateral projection of each drive key may be disposed in an axially overlapping, with respect to the longitudinal axis, position with respect to the portion of the skirt. The first locking drive key may further include a threaded aperture defined through the main body portion and the central projection thereof which is threadingly engaged with the first threaded portion of the differential screw member. The second locking drive key may further include a threaded aperture defined through the main body portion and the central projection thereof which is threadingly engaged with the second threaded portion of the differential screw member. The differential screw member may further include a feature formed in either or both of the first end or the second end thereof which is structured to be engaged by a correspondingly formed tool for rotating the differential screw member about a central longitudinal axis thereof.

The clamping face of each cut-out region may be oriented generally perpendicular to the longitudinal axis in a tangential direction and tapered at an angle in the radial direction relative to a reference plane disposed perpendicular to the longitudinal axis.

The angle may be in the range of about of about 1° to about 5°.

The cutting portion may be generally disc-shaped and may define a peripheral portion having a plurality of blades formed therein with a flute disposed between adjacent blades.

The number of inner surfaces may be disposed parallel to the longitudinal axis.

The number of inner surfaces may be disposed at an angle relative to the longitudinal axis.

As another aspect of the disclosed concept a cutting head for use in a modular cutting tool is provided. The cutting head comprises: a cutting portion structured to perform cutting operations on a workpiece when rotated about a central longitudinal axis; and a cylindrical skirt extending axially from the cutting portion and terminating at a contact face disposed perpendicular to the longitudinal axis. The skirt includes: a number of curved inner surfaces which generally define a bore disposed about the longitudinal axis which is positioned and sized to receive a portion of a shank therein, and a number of cut-out regions which extend from the contact face toward the cutting portion between the number of inner surfaces and an outer surface, each cut-out region being bound, in-part, by a leading face, a trailing face, and by a clamping face which is formed on a portion of the skirt which extends generally circumferentially into each cutout region from the trailing edge.

The clamping face of each cut-out region may be oriented generally perpendicular to the longitudinal axis in a tangential direction and tapered in the radial direction at an angle relative to a reference plane disposed perpendicular to the longitudinal axis.

The angle may be in the range of about of about 1° to about 5°.

The cutting portion may be generally disc-shaped and may define a peripheral portion having a plurality of blades formed therein with a flute disposed between adjacent blades.

The number of inner surfaces may be disposed parallel to the longitudinal axis.

The number of inner surfaces may be disposed at an angle relative to the longitudinal axis.

The angle may be in the range of about 2° to about 5°.

As yet another aspect of the disclosed concept a shank for use in a modular cutting tool is provided. The shank comprises: a cylindrical portion of a first diameter disposed about a central longitudinal axis; a central protrusion of a second diameter less than the first diameter extending longitudinally from a contact face disposed perpendicular to the longitudinal axis at a leading end of the cylindrical portion; a first alcove formed in the cylindrical portion abutting the contact surface; a second alcove formed in the cylindrical portion abutting the contact surface opposite the first alcove; and a transverse bore extending between the first alcove and the second alcove and disposed about a transverse axis which is disposed perpendicularly to, and intersects the longitudinal axis.

The central protrusion may be generally cylindrically shaped.

The central protrusion may be tapered.

The shank may further comprise a mechanism comprising: a first locking drive key; a second locking drive key; and a differential screw member disposed through the transverse bore and having a first threaded portion disposed at or about a first end and a second threaded portion disposed at or about a second end opposite the first end, wherein the first threaded portion includes a first plurality of threads disposed in a first direction and second threaded portion includes a second plurality of threads disposed in a second direction, opposite the first direction. The first locking drive key and the second locking drive key may each comprise: a main body portion generally disposed within a respective one of the first alcove or the second alcove, the main body portion having: an inner face facing toward the longitudinal axis; an outer face disposed opposite the inner face; a leading side face which extends between the inner face and the outer face on a leading side of the main body portion when the shank is rotated about the longitudinal axis in a cutting direction; and a trailing side face which extends between the inner face and the outer face on a trailing side of the main body portion when the shank is rotated about the longitudinal axis in the cutting direction. The first locking drive key and the second locking drive key may further comprise a central projection extending from the inner face of the main body portion radially inward toward the longitudinal axis; and a lateral projection extending generally tangentially with respect to a reference circle centered about the longitudinal axis from the trailing side face of the main body portion at or about an upper portion of the main body portion. The first locking drive key may further include a threaded aperture defined through the main body portion and the central projection thereof which is threadingly engaged with the first threaded portion of the differential screw member and the second locking drive key may further include a threaded aperture defined through the main body portion and the central projection thereof which is threadingly engaged with the second threaded portion of the differential screw member. The differential screw member may further include a feature formed in either or both of the first end or the second end thereof which is structured to be engaged by a correspondingly formed tool for rotating the differential screw member about a central longitudinal axis thereof.

It is to be understood that for a given example set forth herein, such example may include at least a portion of the subject matter of one or more of any other examples also set forth herein.

These and other examples are described in greater detail in the detailed description which follows.

BRIEF DESCRIPTION OF THE DRAWINGS

Figure 1:
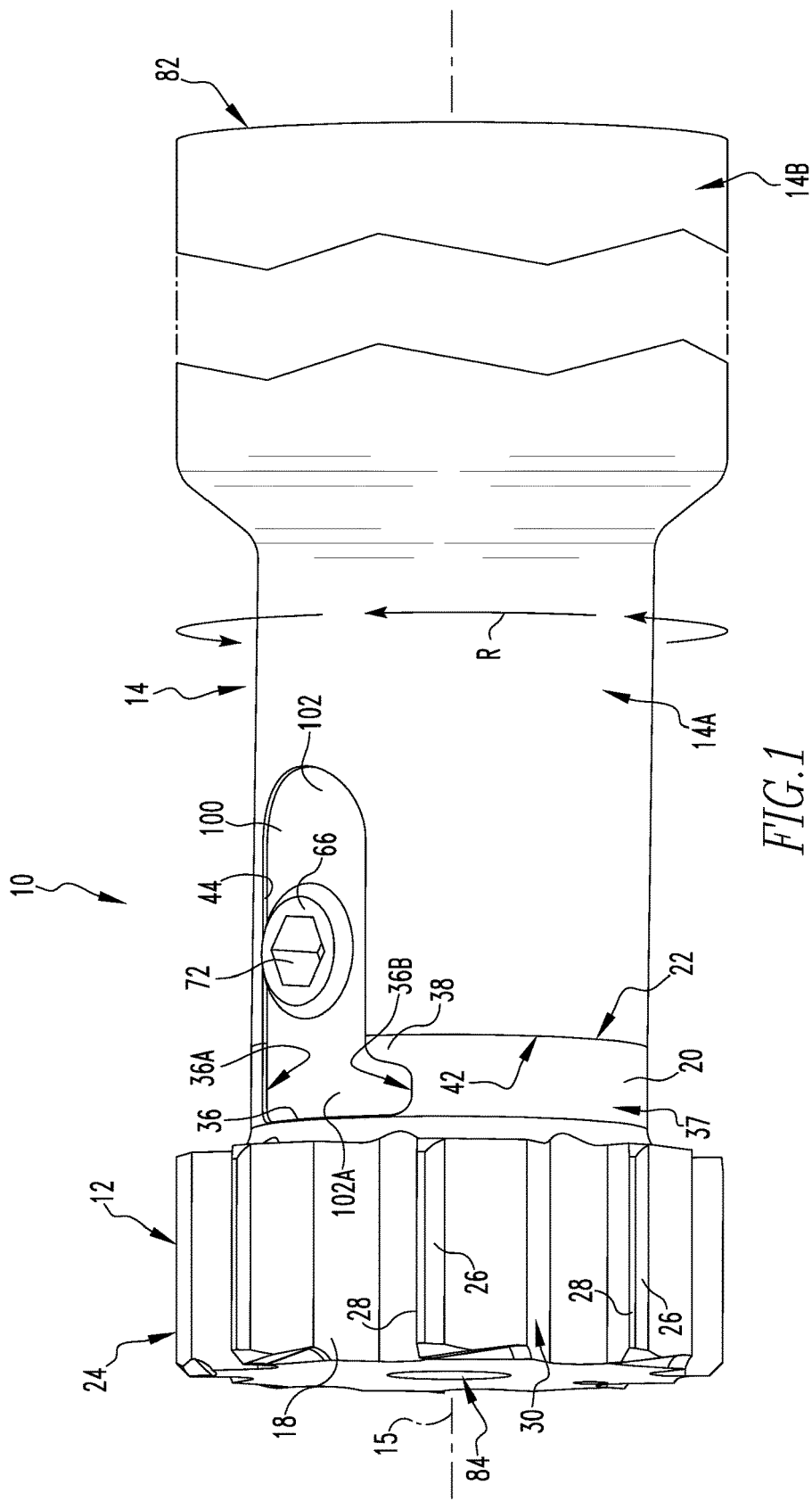

Having thus described examples of the disclosure in general terms, reference will now be made to the accompanying drawings, which are not necessarily drawn to scale, and wherein like reference characters designate the same or similar parts throughout the several views. While various embodiments of the disclosed concept are illustrated, the particular embodiments shown should not be construed to limit the claims. It is anticipated that various changes and modifications may be made without departing from the scope of the disclosed concept.

FIG. 1 is a perspective view of an example modular cutting tool according to one implementation described herein.

Figure 2:
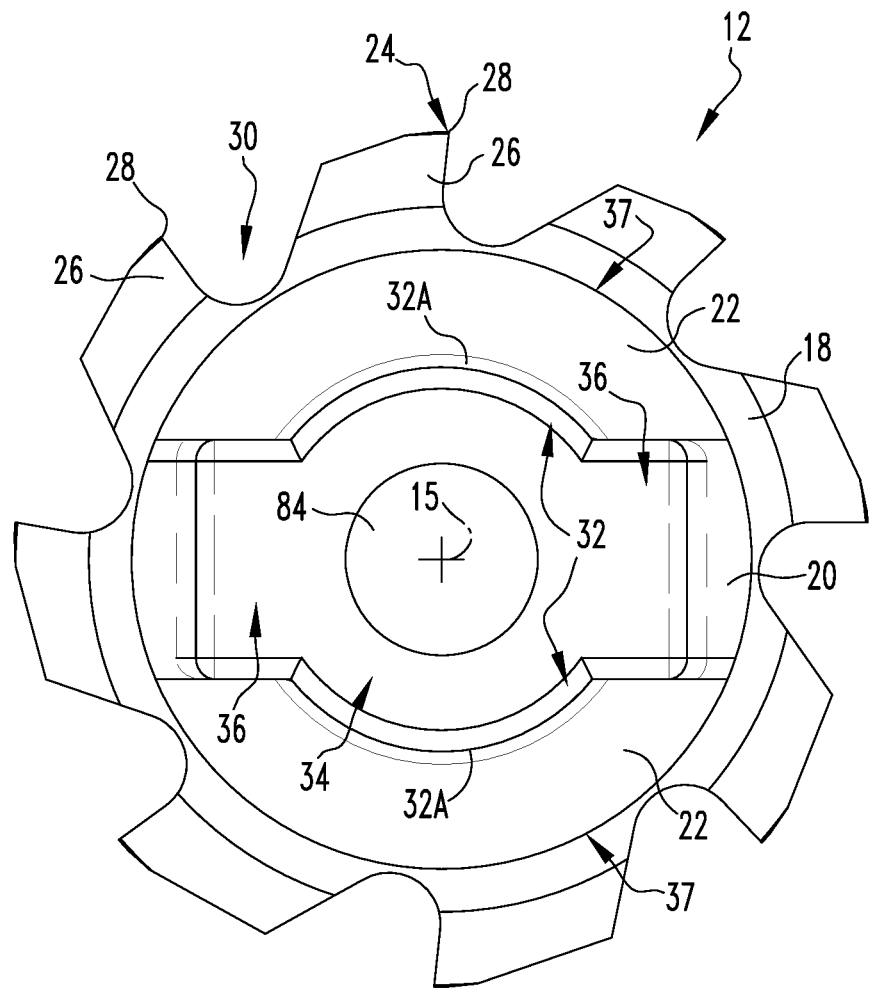

FIG. 2 is a bottom view of the cutting head of the modular cutting tool of FIG. 1.

Figure 3:
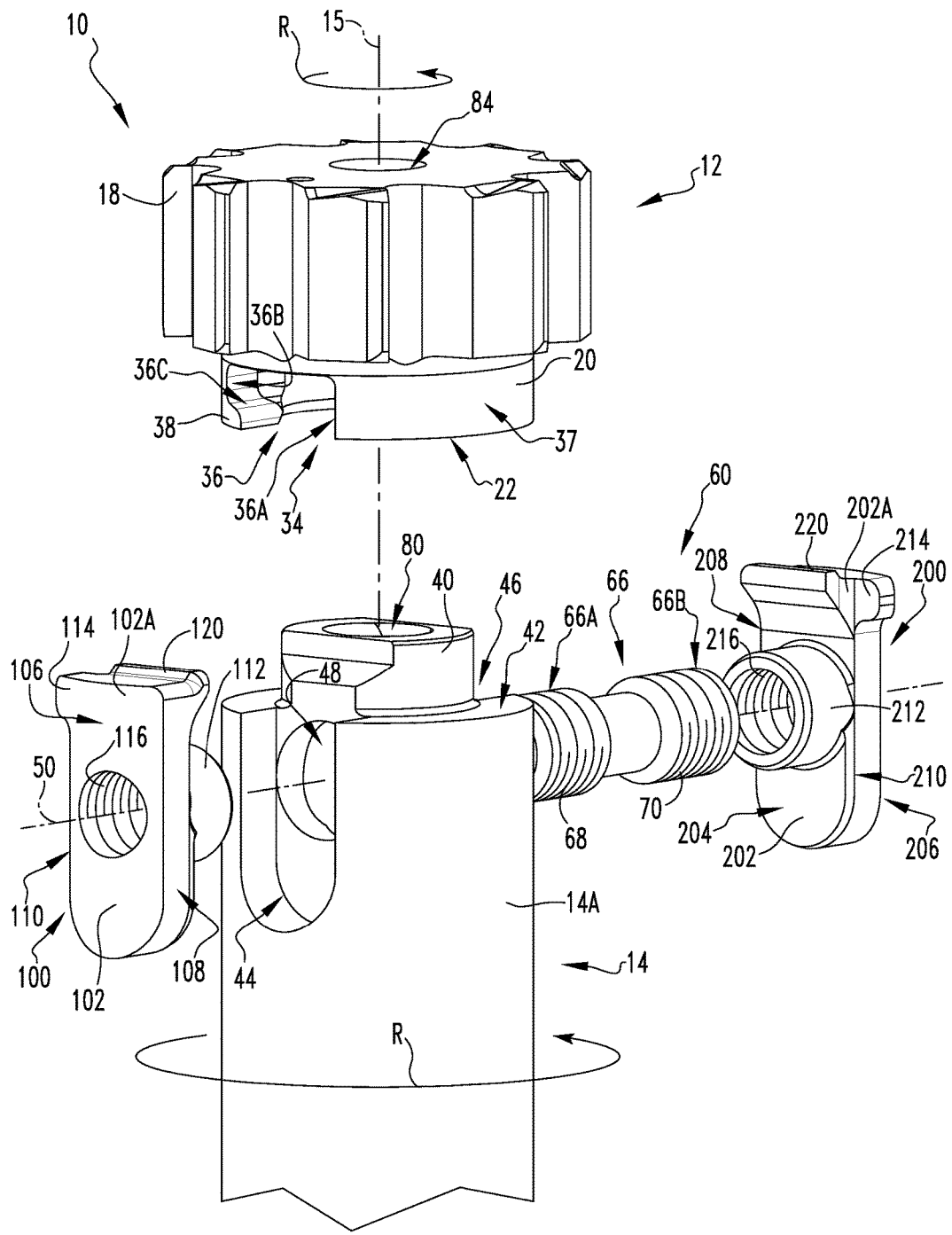

FIG. 3 is an exploded perspective view of the modular cutting tool of FIG. 1.

Figure 4:
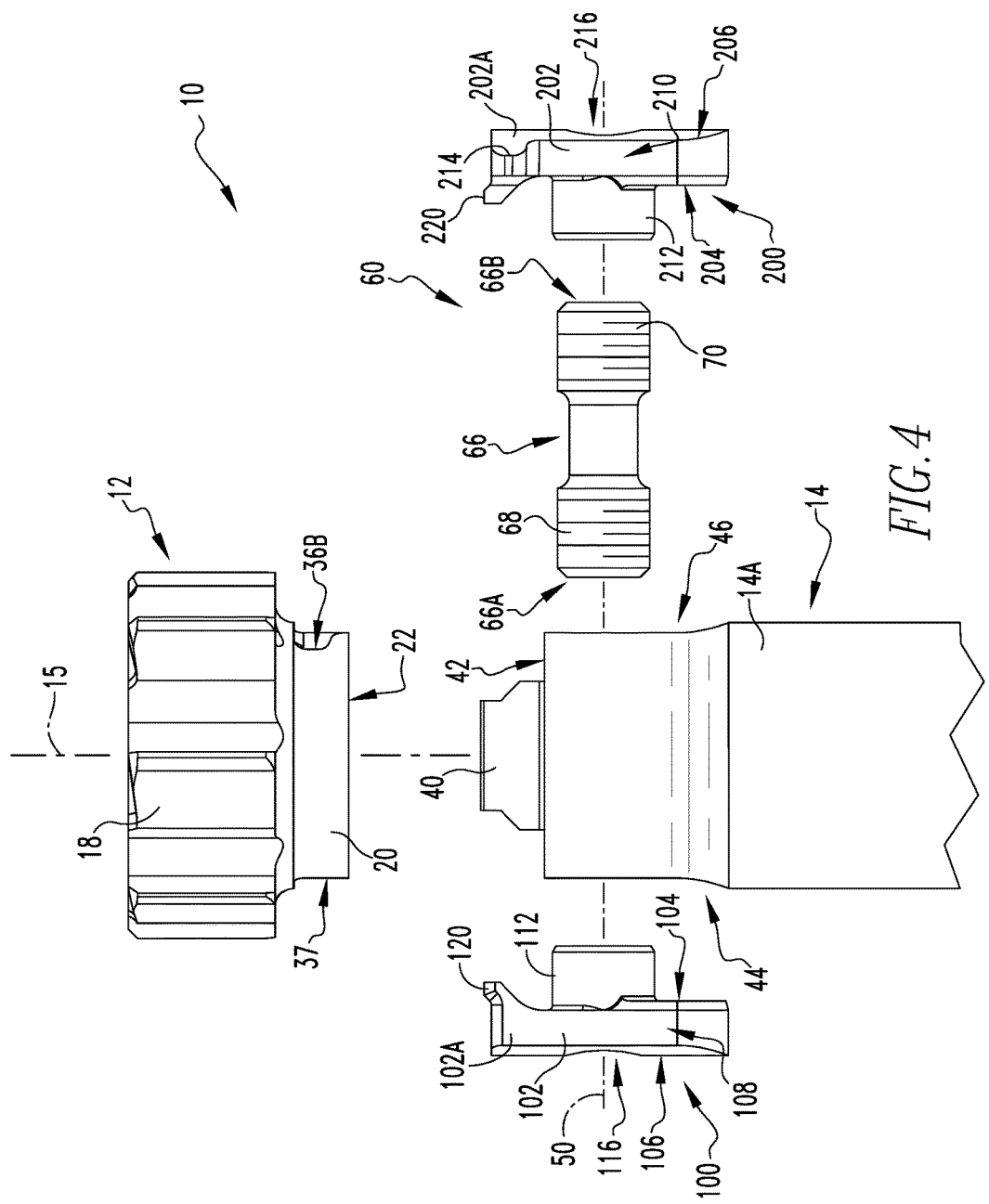

FIG. 4 is an exploded elevation view of the modular cutting tool of FIG. 1.

Figure 5:
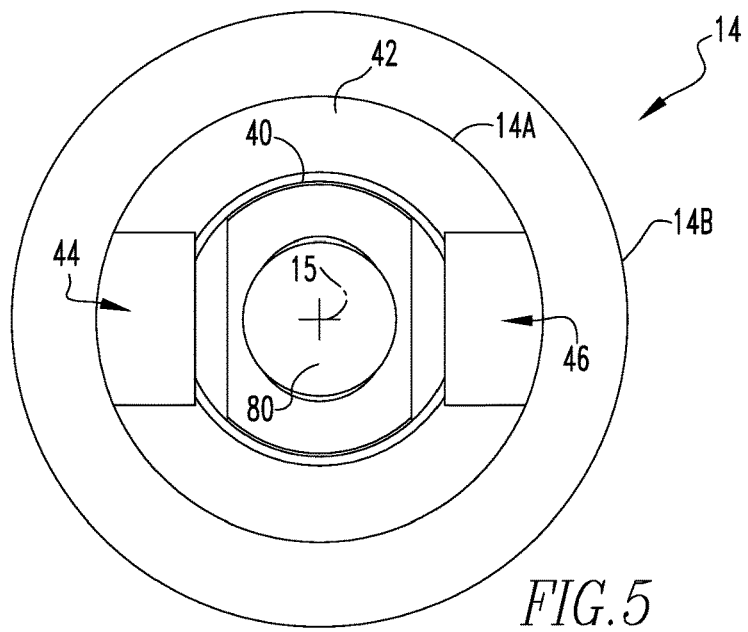

FIG. 5 is a top view of the shank of the modular cutting tool of FIG. 1.

Figure 6:
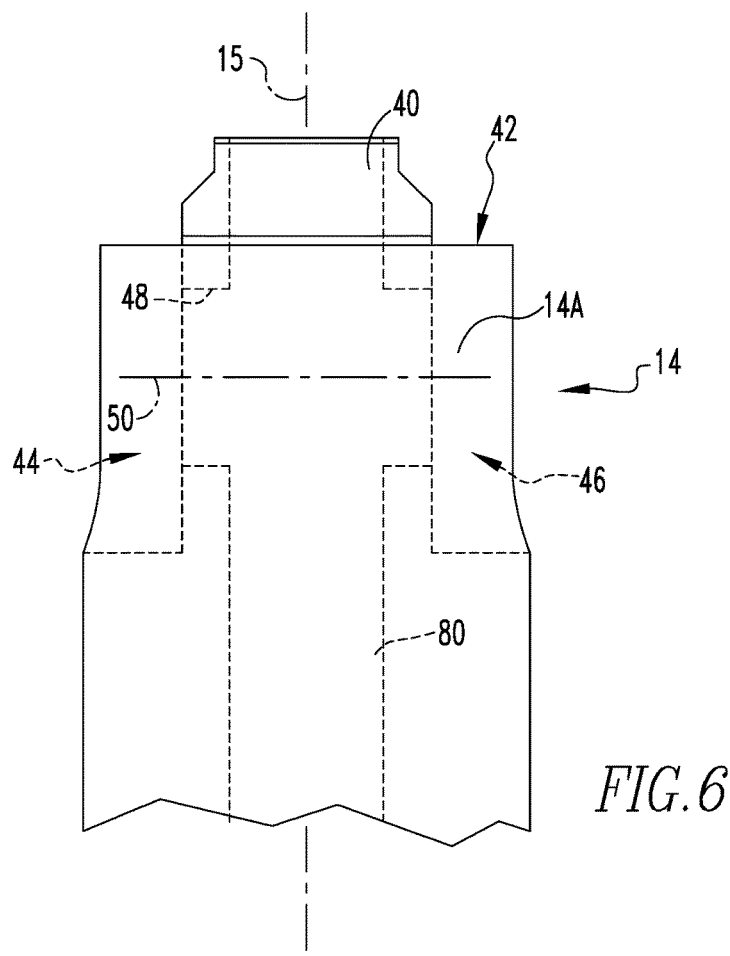

FIG. 6 is an elevation view of the shank of the modular cutting tool of FIG. 1.

Figure 7:
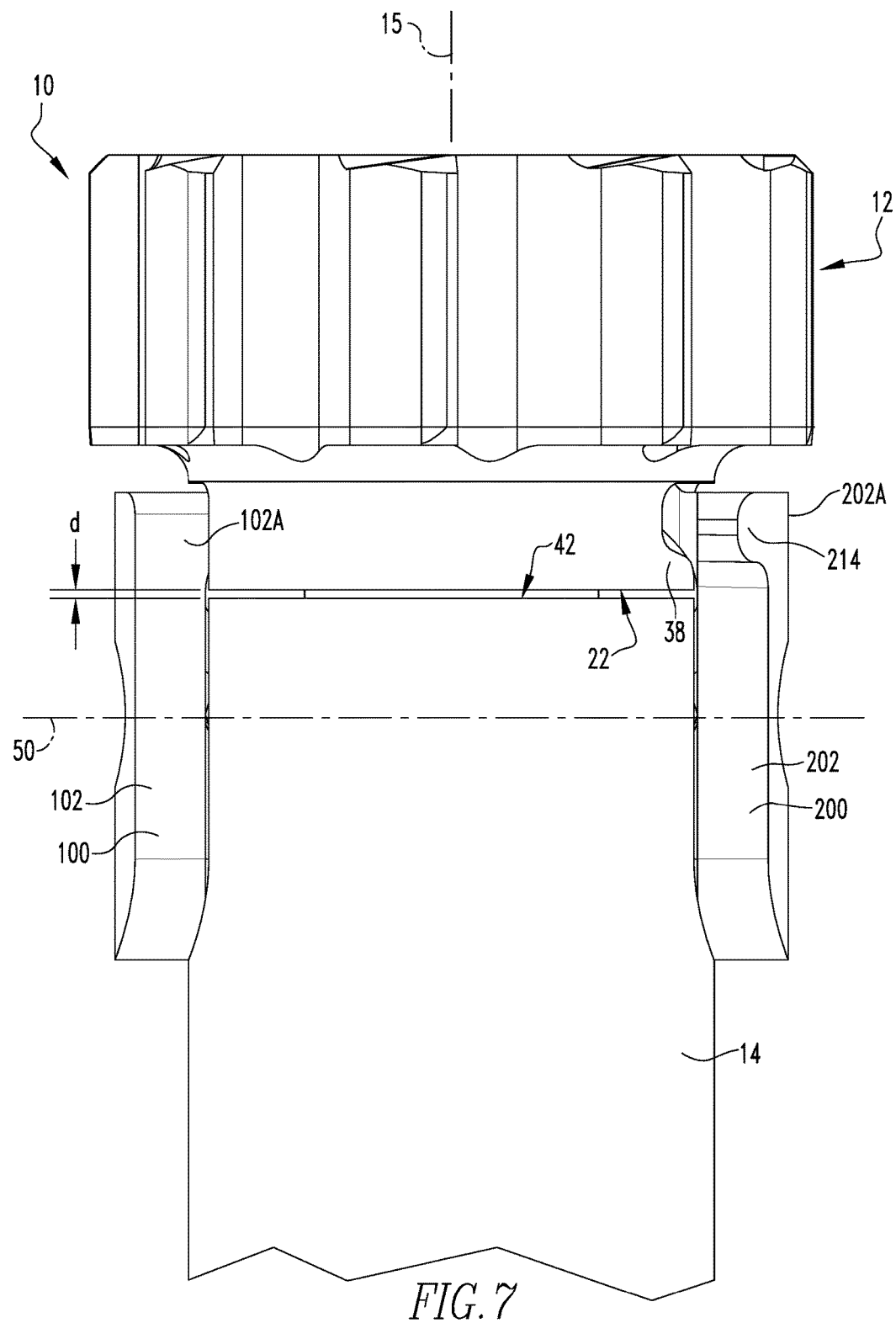

FIG. 7 is an elevation view of the modular cutting tool of FIG. 1 shown with the cutting head disposed in an initial, partially installed position on the shank.

Figure 8:
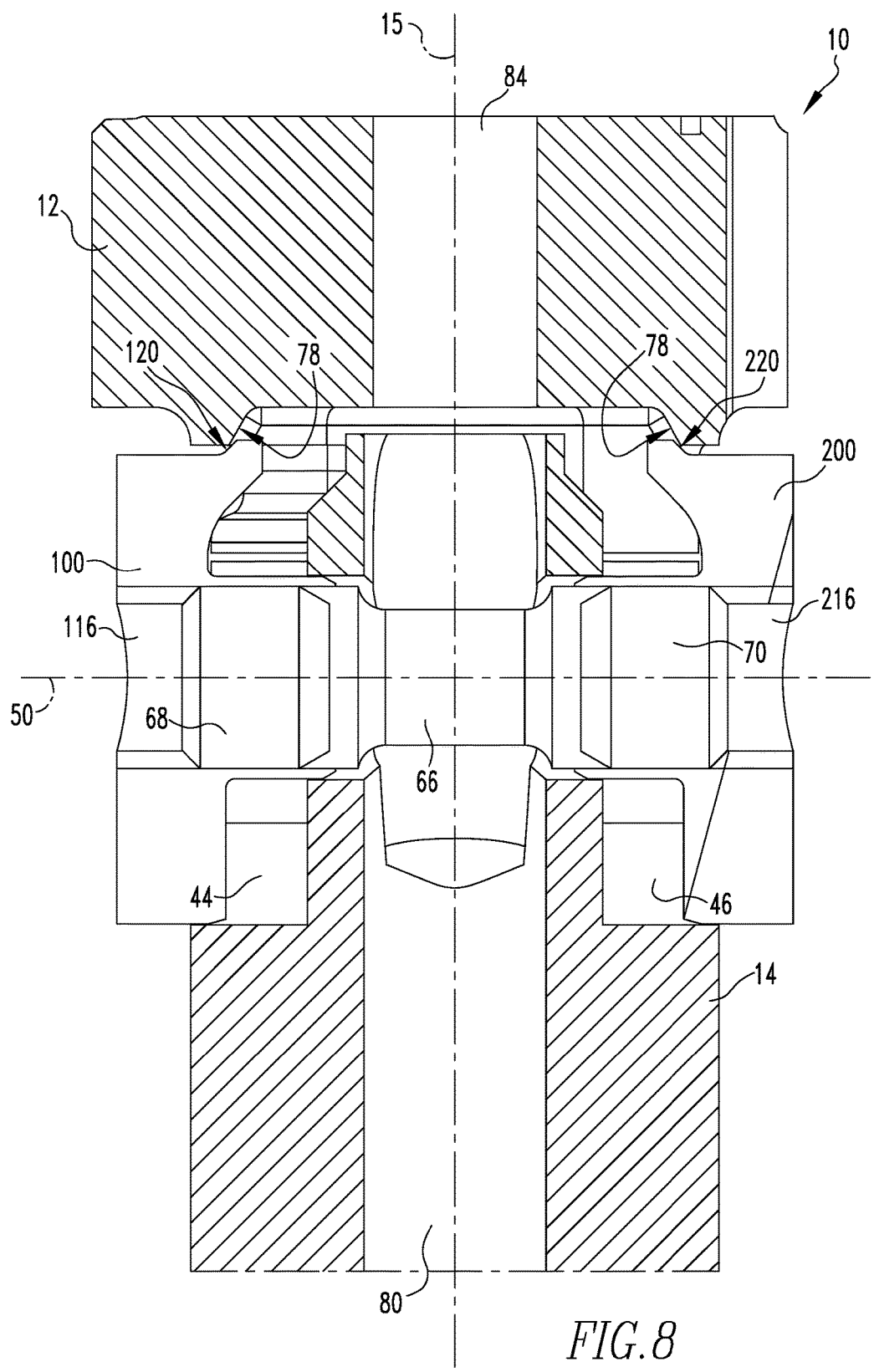

FIG. 8 is a sectional view of the modular cutting tool of FIG. 7 taken along a plane parallel to the view of FIG. 7 which passes through the longitudinal axis of the system.

Figure 9:
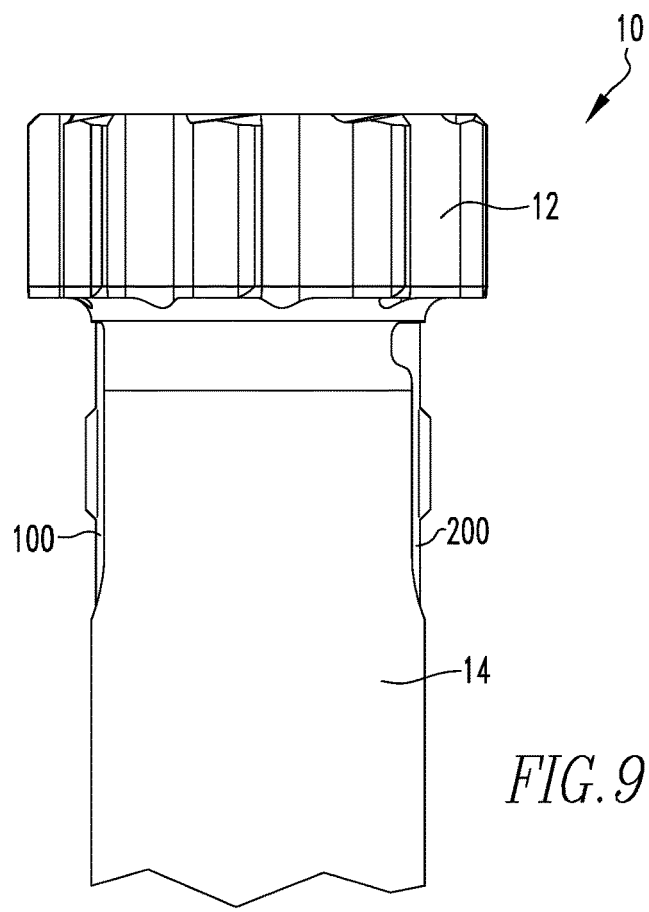

FIG. 9 is an elevation view of the modular cutting tool of FIG. 1 shown with the cutting head disposed in a final, fully installed position on the shank.

Figure 10:
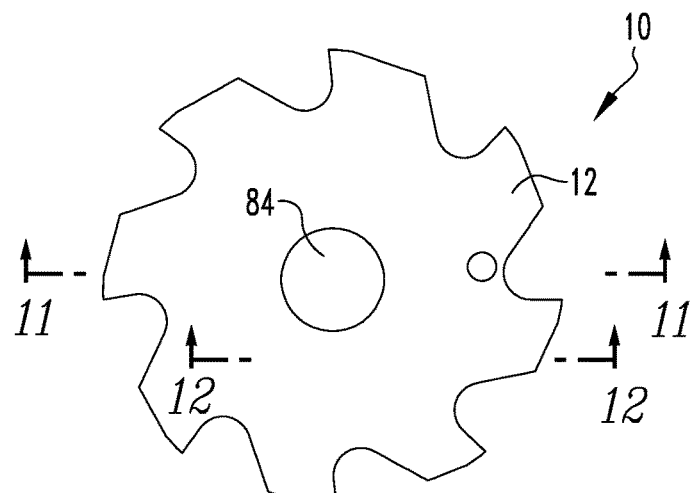

FIG. 10 is a top view of the modular cutting tool of FIG. 9.

Figure 11:
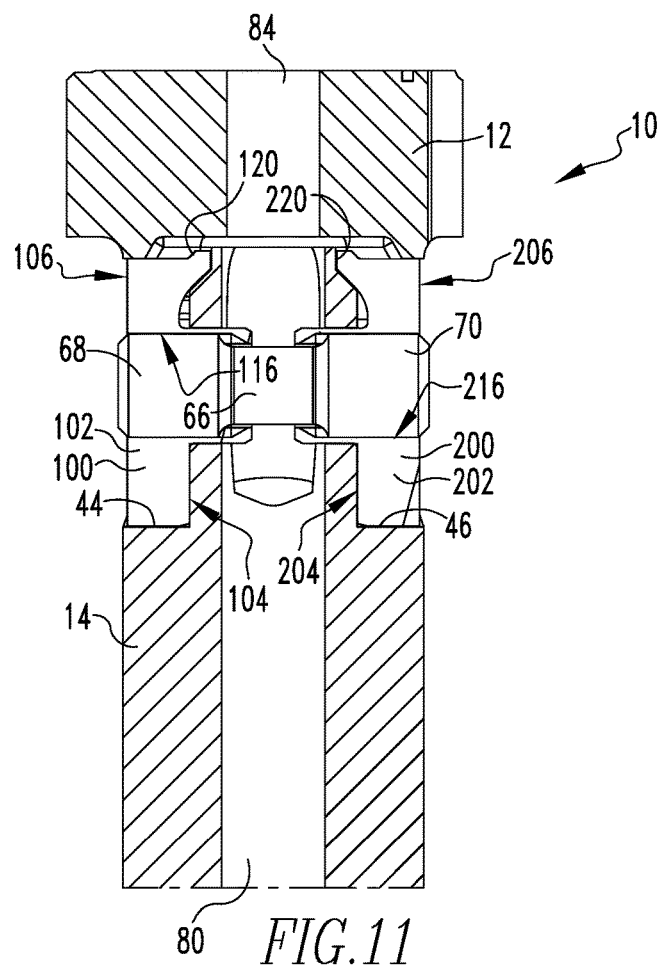

FIG. 11 is a sectional view of the modular cutting tool of FIG. 8 taken along line 10-10 of FIG. 10.

Figure 12:
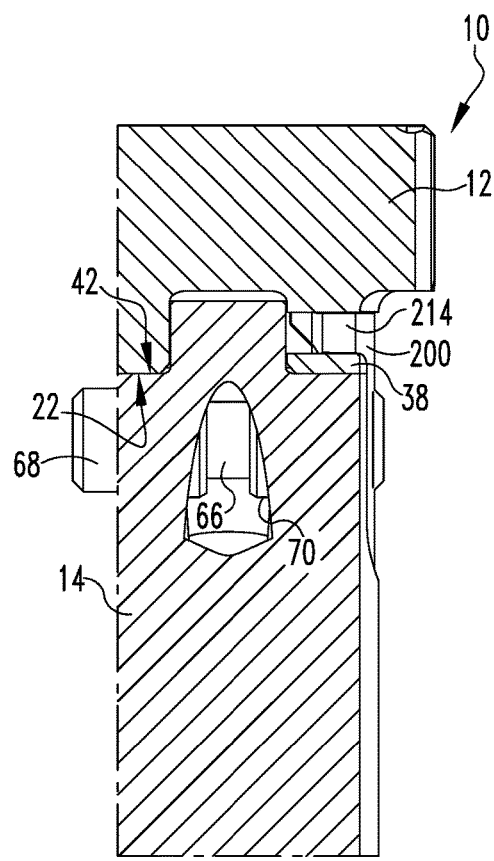

FIG. 12 is a sectional view of the modular cutting tool of FIG. 8 taken along line 11-11 of FIG. 10.

DETAILED DESCRIPTION

Implementations described herein can be understood more readily by reference to the following detailed description and examples and their previous and following descriptions. Elements, apparatus and methods described herein, however, are not limited to the specific implementations presented in the detailed description and examples. It should be recognized that these implementations are merely illustrative of the principles of the present disclosure. Numerous modifications and adaptations will be readily apparent to those of skill in the art without departing from the spirit and scope of the present disclosure.

Whenever the term "about" or "approximately" is used herein or in the appended claims to modify the dimensions of a feature of an implementation of the present disclosure, it is to be construed as referring to the parameters related to the relevant feature. Whenever a range is used herein or in the appended claims to describe dimensions, temperatures, times, amounts, or the like relating to a feature of an aspect of the present disclosure, the range is to be construed as including the stated end points of the range and every point therebetween.

As used herein, the phrase "selectively coupled" shall be used to refer to a coupling of two or more components in which the components may be readily uncoupled and recoupled without damage to the components.

As used herein, the term "number" shall be used to refer to any non-zero quantity.

FIG. 1 illustrates an example implementation of a modular cutting tool 10, and in particular, a modular reamer system in accord with the present disclosure. Modular cutting tool 10 includes a carbide or cermet rotary cutting head, or "cutting head 12", which is selectively coupled to a shank 14. Cutting head 12 and shank 14 are both disposed about a longitudinal axis 15 around which modular cutting tool 10 is rotated (in a direction such as shown by arrow R in FIGS. 1-3) via a suitable machine tool (not shown) during cutting operations.

Cutting head 12 is in one example embodiment a monolithic, or solid, carbide or cermet member defining a carbide cutting portion 18 and a cylindrical carbide skirt 20 which projects axially from cutting portion 18 and terminates at a contact face 22 disposed perpendicular to longitudinal axis 15. Cutting portion 18 is generally disc-shaped and defines a peripheral portion, or circumferentially-extending edge, generally 24. Formed into and integral with cutting portion 18 are carbide blades, generally 26, each having at least one carbide cutting surface, or edge, 28. A flute 30 is defined between adjacent blades 26, and flutes 30 alternate with blades 26 about the peripheral portion, generally, 24 of cutting portion 18. Although cutting portion 18 is shown in the drawing as having generally straight left-hand flutes 30 for rotation in a counterclockwise direction as shown by the arrow R in FIG. 1, it is to be understood that the disclosed concept is not limited to such left-hand orientation and that cutting portion 18 could have right-hand fluting, angled fluting and/or fluting of other orientations.

Referring to FIG. 2, which shows a bottom view of cutting head 12, skirt 20 includes a number of curved inner surfaces 32 which generally define a bore 34, disposed about longitudinal axis 14. In an example embodiment, bore 34 is coaxial with longitudinal axis 14. As discussed further below, bore 34 is positioned and sized to receive a portion of shank 14 therein. In order to assist in reception of such portion of shank 14, the number of curved inner surfaces 32 may include a beveled portion 32A adjacent contact face 22. The number of curved inner surfaces 32 may be disposed parallel to longitudinal axis 14, thus making bore 34 of generally cylindrical shape. Alternatively, the number of curved inner surfaces 32 may be disposed at an angle, for example, without limitation of about 2° to about 5° relative to longitudinal axis 15, thus making bore 34 of generally tapered shape. Skirt 20 further includes a number of cut-out regions 36 which extend from contact face 22 toward cutting portion 18 between inner surfaces 32 and an outer surface 37. As shown in FIG. 3, each cut-out region 36 is bound in-part by a leading face 36A, by a trailing face 36B, and by a clamping face 36C. Clamping face 36C is oriented generally perpendicular to longitudinal axis 15 in a tangential direction and may be tapered at an angle in the range of about of about 1° to about 5° in the radial direction in regard to a reference plane (not shown) disposed perpendicular to longitudinal axis 15. Clamping face 36C is formed on a portion 38 of skirt 20 which extends generally circumferentially into each cut-out region 36 from trailing edge 36B. Further details and the purpose of such cut-out regions 36 and portions 38 are discussed below.

Cutting portion 18, skirt 20, blades 26, and cutting edges 28 are in one example all formed integrally with one another from a monolithic, or solid, portion of carbide.

In another example a cutting portion 18 could be constructed from a monolithic, or solid, cermet member, with cutting portion 18, skirt 20, blades 26, and cutting edges 28 all formed integrally with one another from a monolithic, or solid, portion of cermet.

In FIG. 1, shank 14 is shown as having a first cylindrical portion 14A and a second cylindrical portion 14B, of a larger diameter than first cylindrical portion 14A. It is to be understood that shank 14 is not limited to such configuration and could include a single cylindrical portion of constant diameter extending its entire length or one or more other profiles, if desired. In one example, shank 14 is made of tool steel, and could, in one implementation be made of H13 steel, although the shank is not limited to a particular type of steel.

As shown in FIGS. 3-6, shank 14 includes a central protrusion 40 which extends longitudinally from a contact face 42 which is disposed perpendicular to longitudinal axis 15 at a leading end of cylindrical portion 14A. Central protrusion 40 is of a lesser diameter than the remainder of shank 14 and is positioned and sized to be disposed in modular fashion in bore 34 of cutting head 12. In an example embodiment, central protrusion 40 and bore 34 interact in an interference fit. In another example embodiment, central protrusion 40 and bore 34 interact in a slide-fit. In embodiments where bore 34 of cutting head 12 is generally cylindrical shaped, central protrusion 40 is likewise generally cylindrical shaped. Alternatively, in embodiments where bore 34 of cutting head 12 is generally tapered in shape, central protrusion 40 is likewise generally tapered in shape. FIG. 7 shows an example arrangement of modular cutting tool 10 wherein cutting head 12 has been placed on shank 14 by positioning central protrusion 40 of shank 14 in bore 32 of cutting head 12. In such arrangement. contact surface 22 of cutting head 12 is initially spaced a distance d from contact surface 42 of shank 14 when cutting head 12 is pushed onto shank 14. As discussed below, modular cutting tool 10 further includes additional mechanisms which are employed to close such distance d and bring contact surface 22 of cutting head 12 into direct engagement with contact surface 42 of shank 14, in addition to reversing such engagement.

Referring to FIGS. 3 and 5, shank 14 further includes a first alcove 44 formed in cylindrical portion 14A abutting contact surface 42 and a second alcove 46 formed in cylindrical portion 14A abutting contact surface 42 opposite first alcove 44. A transverse bore 48 disposed about a transverse axis 50, which is disposed perpendicularly to, and intersects longitudinal axis 15, extends between first alcove 44 and second alcove 46.

Modular cutting tool 10 further includes a mechanism 60 for assisting in assembling and locking cutting head 12 to shank 14. As shown in FIGS. 3 and 4, mechanism 60 includes a first locking drive key 100, a second locking drive key 200, and a differential screw member 66. First and second locking drive keys 100 and 200 may be formed from a hardened steel or other suitable material. Differential screw member 66 is sized to fit within transverse bore 46 of shank 14 and includes a first threaded portion 68 disposed at or about a first end 66A of differential screw member 66 and a second threaded portion 70 disposed at or about a second end 66B of differential screw member opposite first end 66A. First threaded portion 68 includes a first plurality of threads disposed in a first direction and second threaded portion 70 includes a second plurality of threads disposed in a second direction, opposite the first direction. Differential screw member 66 further includes a feature 72 formed in either or both of first end 66A and second end 66B which is structured to be engaged by a correspondingly formed tool for rotating differential screw member 66A about a central longitudinal axis thereof. In the example embodiment illustrated in the figures, feature 72 is in the form of a hexagonal shaped recess which can be readily engaged by a hex key or an alien wrench, however, it is to be appreciated that other suitable features may be employed which are engageable by corresponding tools without varying from the scope of the disclosed concept.

Referring primarily to FIGS. 3 and 4, first locking drive key 100 includes a main body portion 102 sized to fit generally within first alcove 44. Main body portion 102 includes an inner face 104 which faces toward longitudinal axis 15; an outer face 106 disposed opposite inner face 104 which faces away from longitudinal axis 15; a leading side face 108 which extends between inner face 104 and outer face 106 on a leading side of main body portion 102 when modular cutting tool 10 is rotated about longitudinal axis 15 in a cutting direction; and a trailing side face 110 which extends between inner face 104 and outer face 106 on a trailing side of main body portion 102 when modular cutting tool 10 is rotated about longitudinal axis 15 in a cutting direction. In an example embodiment, faces 104 & 106 are clearance faces while faces 108 and 110 are a slide fit. In the example embodiment illustrated in the FIGS, outer face 106 is generally curved to match the curved outer surface of shank 14.

Continuing to refer primarily to FIGS. 3 and 4, first locking drive key 100 further includes a central projection 112 which extends from inner face 104 of main body portion 102 radially inward toward longitudinal axis 15; and a lateral projection 114 which extends generally tangentially with respect to a reference circle centered about longitudinal axis 15 from trailing side face 110 of main body portion 102 at or about an upper portion 102A of main body portion. Central projection 112 is sized, for example with a clearance fit, to fit within transverse bore 48 in a manner such that first locking drive key can readily slide toward or away from longitudinal axis 15.

First locking drive key 100 further includes a threaded aperture 116 defined through main body portion 102 and central projection 112 which is structured to be threadingly engaged by first threaded portion 68 of differential screw member 66.

Second locking drive key 200 is of generally the same arrangement as first locking drive key 100 and thus likewise includes: a main body portion 202 sized to fit generally within second alcove 46; an inner face 204 which faces toward longitudinal axis 15; an outer face 206 disposed opposite inner face 204 which faces away from longitudinal axis 15; a leading side face 208 which extends between inner face 204 and outer face 206 on a leading side of main body portion 202 when cutting tool 10 is rotated about longitudinal axis 15 in a cutting direction; a trailing side face 210 which extends between inner face 204 and outer face 206 on a trailing side of main body portion 202 when modular cutting tool 10 is rotated about longitudinal axis 15 in a cutting direction; a central projection 212 which extends from inner face 204 of main body portion 202 radially inward toward longitudinal axis 15; and a lateral projection 214 which extends from trailing side face 210 of main body portion 202 generally tangentially with respect to a reference circle centered about longitudinal axis 15.

Second locking drive key 200 differs from first locking drive key 100 in that second locking drive key 200 includes a threaded aperture 216 defined through main body portion 202 and central projection 212 which is structured to be threadingly engaged by second threaded portion 70 of differential screw member 66, and thus is of opposite thread than threaded aperture 116 of first locking drive key 100.

From the foregoing description of mechanism 60, it is thus to be appreciated that when first locking drive key 100 and second locking drive key 200 are both threadingly engaged with the corresponding portions of differential screw member 66, rotation of differential screw member 66 about axis 50 results in movement of first and second locking drive keys 100 and 200 either toward each other, or way from each other, depending on the direction in which differential screw member 66 is rotated.

Having thus described the general arrangement and operation of mechanism 60, use of mechanism 60 in modular cutting tool 10 will now be discussed. FIGS. 7 and 8 show an arrangement wherein first and second locking drive keys 100 and 200 are disposed in a first position, wherein each drive key 100, 200 is disposed at or about an outward edge of respective alcoves 44 and 46, and wherein cutting head 12 has been placed on shank 14 such that contact face 22 of cutting head 12 is spaced a distance d from corresponding contact face 42 of shank 14. Such arrangement corresponds to when a cutting head 12 is first placed on shank 14. Subsequent to such placement, differential screw 66 is rotated about axis 50, in a manner such as previously discussed, thus causing main body portions 102 and 202 of each of first and second locking drive keys 100 and 200 to move into respective alcoves 44 and 46 until each locking drive key 100, 200 is firmly seated in each respective alcove 44, 46, such as shown in FIGS. 9 and 11. During such movement, an upper portion 102A and 202A of each main body portion 102 and 202 of each drive key 100 and 200 moves into a respective cut-out portion 36 of skirt 20 of cutting head 12 and the lateral projection 114, 214 of each drive key 100, 200 moves into an axially overlapping position with respect to a corresponding portion 38 of skirt 20. One or both of each portion 38 of skirt 20 and/or lateral projections 114 and 214 of locking drive keys 100 and 200 are structured) to force contact face 22 of cutting head 12 and contact face 42 of shank 14 toward each other, thus bringing contact faces 22 and 42 to bear directly against each other, as locking drive keys 100 and 200 are moved from a first positioning such as shown in FIGS. 7 and 8 to a second positioning such as shown in FIGS. 9, 11 and 12. In the example illustrated embodiment, angled clamping faces 36C (FIG. 3) of each portion 38 of skirt 20 interact with corresponding lower faces of lateral projections 114 and 214 of locking drive keys 100 and 200 to force contact faces 22 and 42 together.

From the foregoing description it is thus to be appreciated that each locking drive key 100, 200, as their names imply, perform two key functions in modular cutting tool 10: i.) each locking drive key 100, 200 serves to effectively prevent removal of cutting head 12 from shank 14, thus "locking" cutting head 12 to shank 14; and ii.) the leading face 108, 208 of the upper portion 102A, 202A of each locking drive key 100, 200 abuts a corresponding leading face 36A of each cut-out portion 36 of skirt 20 of cutting head 12 in a manner such that such portions of each locking drive key serves to "drive" cutting head 12 about longitudinal axis 15 when shank 14 is rotated about longitudinal axis 15.

It may be desirable to at some time separate cutting head 12 from shank 14. This may be the case if cutting head 12 becomes worn, obsolete, is needed in another application, etc. Whatever the reason for detaching cutting head 12 from shank 14, the example implementation of the disclosure illustrated in FIGS. 3 and 8 also includes a mechanism for assisting in separating cutting head 12 from the shank 14. More particularly, each locking drive key 100, 200 includes an upper ramped portion 120, 220 which each interact with a corresponding angled face 78 of cutting head 12 in a manner which produces an upward force such that cutting head 12 is forced axially away from shank 14 when locking drive keys 100 and 200 are moved outward from longitudinal axis 15, thus creating a space between contact face 22 of cutting head 12 and contact face 42 of shank 14.

As shown in FIGS. 3, 5, 6, 8 and 11, shank 14 may include a conduit 80 generally coaxial with longitudinal axis 15. Conduit 80 can be used to deliver coolant and/or lubricant from an end face 82 of shank 14 to a corresponding cutting head conduit 84 in cutting head 12. Conduit 84 may extend from a location generally bounded by skirt 20 of cutting head 12 to one or more cutting portion ports configured to deliver coolant and/or lubricant fluids to blades 26 during use of cutting head 12.

Because in one example cutting head 12 is entirely carbide or cermet, it may readily be reworked and/or reshaped to remain a tool of the same character, i.e., it remains a reamer tool, or it may be reshaped into another type of rotary cutting head such as a milling head, drill, boring head, burring head, knurling head, etc.

Also, as to recycling or reuse of modular cutting tool 10 components, cutting head 12 can be reused as discussed above, and shank 14 can similarly be reused in connection with other rotary cutting components, if desired. As to recycling specifically, because of the modular nature of the components of modular cutting tool 10, the carbide and steel components can be readily segregated into specific material groupings, such as individual carbide, cermet and/or steel groupings, rather than being placed in mixed materials recycling paths. This could potentially result in increased recycling efficiencies.

Because blades 26 of modular cutting tool 10 are integral with the peripheral surface 24 of cutting head 12, space-consuming blade pockets, cutting edges, and brazings on such peripheral surface may be eliminated. Accordingly, by freeing up space on peripheral surface 24 formerly required by such pockets, brazings, etc., a significantly higher number of blades 26, cutting edges 28, and flutes 30 may be formed about peripheral surface 24.

Cutting head 12 may, in one example implementation, include a coating, such as a physical vapor deposition and/or chemical vapor deposition coating, to improve and/or modify wear and operation. Because of the solid carbide construction used in an exemplary implementation, cutting head 12 may be subjected to the temperatures required for certain physical vapor deposition and/or chemical vapor deposition processes while still maintaining dimensional stability and tolerances of the flutes 30 and cutting edges 28.

While example implementations of modular cutting tools have been disclosed, it is to be understood that the present disclosure is not limited to modular tools configured for rotary use and that application of the present disclosure to tools other than rotary cutting tools is contemplated herein.

Various implementations of the present disclosure have been described in fulfillment of the various objectives of the present disclosure. It should be recognized that these implementations are merely illustrative of the principles of the present disclosure. Moreover, although the foregoing descriptions and the associated drawings illustrate examples in the context of certain example combinations of elements and/or functions, numerous modifications and adaptations thereof will be readily apparent to those skilled in the art without departing from the spirit and scope of the present disclosure.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

We claim:

1. A modular cutting tool comprising:
a cutting head comprising:
　a cutting portion rotatable about a central longitudinal axis; and
　a cylindrical skirt extending axially from the cutting portion and terminating at a contact face disposed perpendicular to the longitudinal axis, the skirt having a number of curved inner surfaces which generally define a bore disposed about the longitudinal axis; and
a shank comprising:
　a cylindrical portion of a first diameter disposed about the longitudinal axis; and
　a central protrusion disposed in the bore of the cutting portion, the central protrusion having a second diameter less than the first diameter and extending longitudinally from a contact face disposed perpendicular to the longitudinal axis at a leading end of the cylindrical portion; and
a mechanism which assists in assembling and locks the cutting head to the shank, wherein the mechanism comprises:
　a first locking drive key;
　a second locking drive key; and
　a differential screw member disposed within the transverse bore and having a first threaded portion disposed at or about a first end and a second threaded portion disposed at or about a second end opposite the first end, wherein the first threaded portion includes a first plurality of threads disposed in a first direction and second threaded portion includes a second plurality of threads disposed in a second direction, opposite the first direction,
wherein the first locking drive key and the second locking drive key each comprise:
　a main body portion fit generally within a respective one of the first alcove or the second alcove, the main body portion having:
　　an inner face facing toward the longitudinal axis;
　　an outer face disposed opposite the inner face;
　　a leading side face which extends between the inner face and the outer face on a leading side of the main body portion when the shank is rotated about the longitudinal axis in a cutting direction; and
　　a trailing side face which extends between the inner face and the outer face on a trailing side of the main body portion when the shank is rotated about the longitudinal axis in the cutting direction;
　a central projection extending from the inner face of the main body portion radially inward toward the longitudinal axis; and
　a lateral projection extending generally tangentially with respect to a reference circle centered about the longitudinal axis from the trailing side face of the main body portion at or about an upper portion of the main body portion,
wherein the upper portion of each main body portion of each drive key is disposed in a respective one of the cut-out regions of the skirt of the cutting tool,
wherein the lateral projection of each drive key is disposed in an axially overlapping, with respect to the longitudinal axis, position with respect to the portion of the skirt,
wherein the first locking drive key further includes a threaded aperture defined through the main body portion and the central projection thereof which is threadingly engaged with the first threaded portion of the differential screw member,
wherein the second locking drive key further includes a threaded aperture defined through the main body portion and the central projection thereof which is threadingly engaged with the second threaded portion of the differential screw member, and
wherein the differential screw member further includes a feature formed in either or both of the first end or the second end thereof which is structured to be engaged by a correspondingly formed tool for rotating the differential screw member about a central longitudinal axis thereof.

2. The modular cutting tool of claim 1, wherein the skirt further includes a number of cut-out regions which extend from the contact face toward the cutting portion between the number of inner surfaces and an outer surface, each cut-out region being bound, in-part, by a leading face, a trailing face, and by a clamping face which is formed on a portion of the skirt which extends generally circumferentially into each cutout region from the trailing face.

3. The modular cutting tool of claim 1, wherein the shank further comprises:
a first alcove formed in the cylindrical portion abutting the contact surface;
a second alcove formed in the cylindrical portion abutting the contact surface opposite the first alcove; and
a transverse bore extending between the first alcove and the second alcove and disposed about a transverse axis which is disposed perpendicularly to, and intersects the longitudinal axis.

4. The modular cutting tool of claim 1, wherein the clamping face of each cut-out region is oriented generally perpendicular to the longitudinal axis in a tangential direction and tapered at an angle in the radial direction relative to a reference plane disposed perpendicular to the longitudinal axis.

5. The modular cutting tool of claim 4, wherein the angle is in the range of about of about 1° to about 5°.

6. The modular cutting tool of claim 1, wherein the cutting portion is generally disc-shaped and defines a peripheral portion having a plurality of blades formed therein with a flute disposed between adjacent blades.

7. The modular cutting tool of claim 1, wherein the number of inner surfaces are disposed parallel to the longitudinal axis.

8. The modular cutting tool of claim 1, wherein the number of inner surfaces are disposed at an angle relative to the longitudinal axis.

9. A cutting head for use in a modular cutting tool, the cutting head comprising:
a cutting portion structured to perform cutting operations on a workpiece when rotated about a central longitudinal axis; and
a cylindrical skirt extending axially from the cutting portion and terminating at a contact face disposed perpendicular to the longitudinal axis, the skirt having:
a number of curved inner surfaces which generally define a bore disposed about the longitudinal axis which is positioned and sized to receive a portion of a shank therein, and
a number of cut-out regions which extend from the contact face toward the cutting portion between the number of inner surfaces and an outer surface, each cut-out region being bound, in-part, by a leading face, a trailing face, and by a clamping face which is formed on a portion of the skirt which extends generally circumferentially into each cutout region from the trailing face,
wherein the clamping face of each cut-out region is oriented generally perpendicular to the longitudinal axis in a tangential direction and tapered in the radial direction at an angle relative to a reference plane disposed perpendicular to the longitudinal axis.

10. The cutting head of claim 9, wherein the angle is in the range of about of about 1° to about 5°.

11. The cutting head of claim 9, wherein the cutting portion is generally disc-shaped and defines a peripheral portion having a plurality of blades formed therein with a flute disposed between adjacent blades.

12. The cutting head of claim 9, wherein the number of inner surfaces are disposed parallel to the longitudinal axis.

13. The cutting head of claim 9, wherein the number of inner surfaces are disposed at an angle relative to the longitudinal axis.

14. The cutting head of claim 13, wherein the angle is in the range of about 2° to about 5°.

15. A shank for use in a modular cutting tool, the shank comprising:
a cylindrical portion of a first diameter disposed about a central longitudinal axis;
a central protrusion of a second diameter less than the first diameter extending longitudinally from a contact face disposed perpendicular to the longitudinal axis at a leading end of the cylindrical portion;
a first alcove formed in the cylindrical portion abutting the contact surface;
a second alcove formed in the cylindrical portion abutting the contact surface opposite the first alcove;
a transverse bore extending between the first alcove and the second alcove and disposed about a transverse axis which is disposed perpendicularly to, and intersects the longitudinal axis;
a mechanism comprising:
a first locking drive key;
a second locking drive key; and
a differential screw member disposed through the transverse bore and having a first threaded portion disposed at or about a first end and a second threaded portion disposed at or about a second end opposite the first end, wherein the first threaded portion includes a first plurality of threads disposed in a first direction and second threaded portion includes a second plurality of threads disposed in a second direction, opposite the first direction,
wherein the first locking drive key and the second locking drive key each comprise:
a main body portion generally disposed within a respective one of the first alcove or the second alcove, the main body portion having:
an inner face facing toward the longitudinal axis;
an outer face disposed opposite the inner face;
a leading side face which extends between the inner face and the outer face on a leading side of the main body portion when the shank is rotated about the longitudinal axis in a cutting direction; and
a trailing side face which extends between the inner face and the outer face on a trailing side of the main body portion when the shank is rotated about the longitudinal axis in the cutting direction;
a central projection extending from the inner face of the main body portion radially inward toward the longitudinal axis; and
a lateral projection extending generally tangentially with respect to a reference circle centered about the longitudinal axis from the trailing side face of the main body portion at or about an upper portion of the main body portion,
wherein the first locking drive key further includes a threaded aperture defined through the main body portion and the central projection thereof which is threadingly engaged with the first threaded portion of the differential screw member,
wherein the second locking drive key further includes a threaded aperture defined through the main body portion and the central projection thereof which is threadingly engaged with the second threaded portion of the differential screw member, and wherein the differential screw member further includes a feature formed in either or both of the first end or the second end thereof which is structured to be engaged by a correspondingly formed tool for rotating the differential screw member about a central longitudinal axis thereof; and wherein the central protrusion is generally cylindrically shaped;

wherein the central protrusion is tapered.

* * * * *